Patented June 17, 1952

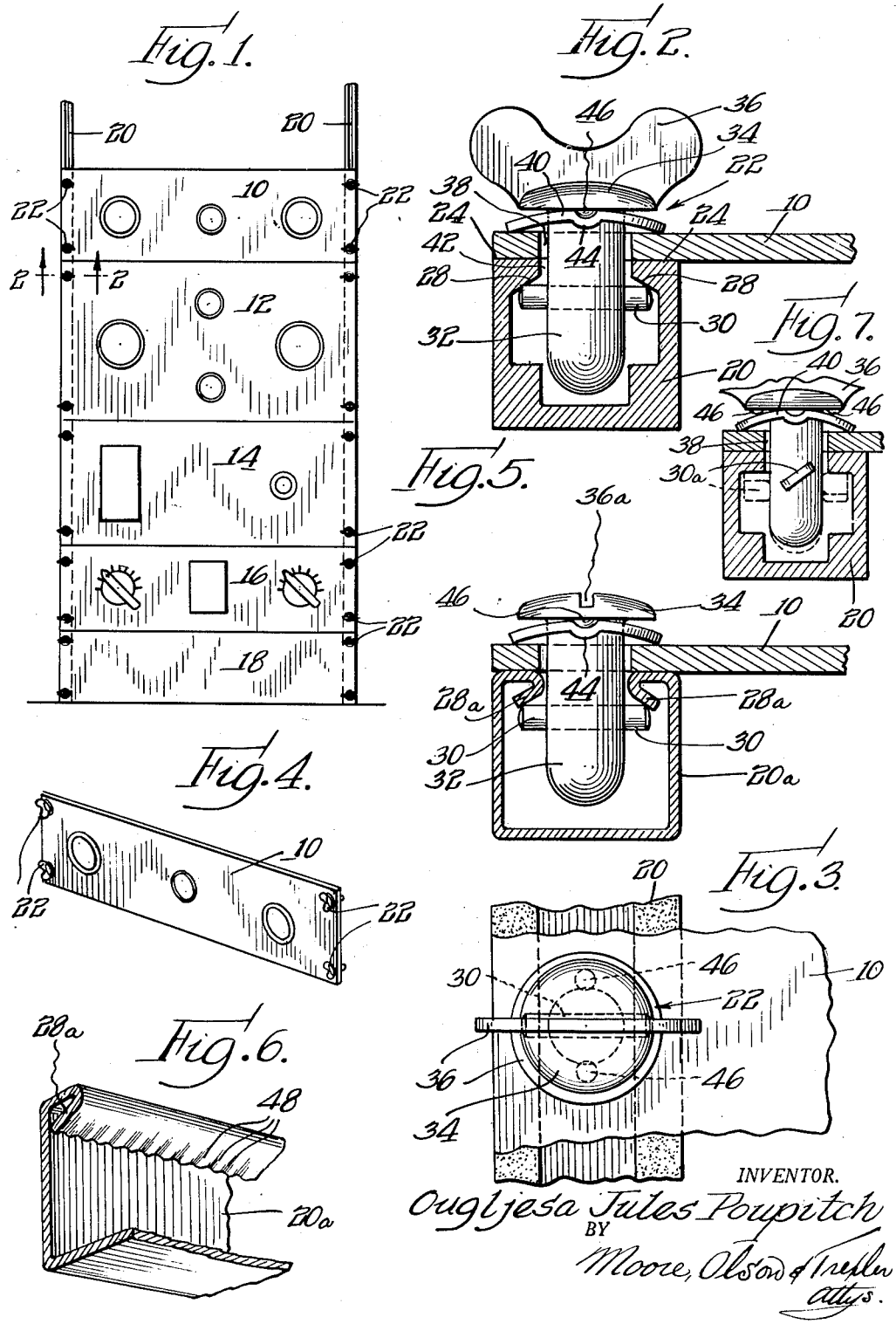

2,601,213

UNITED STATES PATENT OFFICE 2,601,213

PANEL FASTENING DEVICE

Ougljesa Jules Poupitch, Chicago, Ill., assignor to Illinois Tool Works, Chicago, Ill., a corporation of Illinois Application December 12, 1947, Serial No. 791,383

4 Claims. (Cl. 189—36)

This invention relates generally to fastening devices, and more particularly to improvements in fastening devices employing a quickly operable rotary fastener member or stud.

It is not uncommon, as, for example, in connection with instrument panels of aircraft, to necessitate removal, attachment and shifting of panel sections to accommodate changes in instrument design. That is to say, if instruments are to be mounted requiring a larger or smaller panel section than the ones used previously, it necessitates adjustment of the panel sections to accommodate this change. Likewise, if panel sections are to be removed for purposes of inspection, instrument repair, etc., it is important that fastening devices for securing the panel sections be employed which may be manipulated quickly and with ease. It is, therefore, one of the important objects of the present invention to provide fastening devices which particularly lend themselves for use in instances where panel sections must not only be firmly secured against loosening due to vibrations, but which also must be quickly and easily detachable.

More specifically, the present invention contemplates a fastening arrangement for panel sections and the like which will enable such sections to be readily attachable and detachable with respect to channeled frame members located in the vicinity of the opposite extremities of the panel sections. To this end it is proposed to employ rotatable fastening studs which require only partial rotation, approximately 90°, for detachably securing the panel sections to the aforesaid frame members.

It is a further object of the present invention to provide fastening devices of the type referred to above, wherein the channeled frame members are of relatively rigid construction, and the rotary fastening members or studs are designed to be resiliently clamped within the rigid channel on one side of the panel section and the head of the stud against the opposite side of the panel section.

The foregoing and other objects and advantages will be more apparent from the foregoing detailed description when considered in connection with the accompanying drawings, wherein—

Fig. 1 is a front elevational view of an instrument panel made up of a plurality of panel sections mounted upon upright channeled frame members, in accordance with the teachings of the present invention;

Fig. 2 is an enlarged transverse sectional view taken along the line 2—2 of Fig. 1, more clearly to illustrate the structural details of the rotary fastener and channeled frame member which cooperate in securing a panel section in place;

Fig. 3 is an enlarged front elevational view of one of the fasteners shown in Fig. 1 with a part of the panel section broken away in order to expose the roughened surface of the channeled frame member;

Fig. 4 is a perspective view showing the uppermost panel section detached from the channeled frame members;

Fig. 5 is a view similar to Fig. 2 illustrating a modified form of channeled frame member;

Fig. 6 is a perspective view of one half of the channel member illustrated in Fig. 5, more clearly to illustrate the undulated surface of the channel member adapted to interlock with a laterally extending lug or cross-pin of a rotary fastener stud; and Fig. 7 discloses a modified fastener device contemplated by the present invention, wherein the lateral lug is provided with a flat cam surface.

Referring now to the drawing more in detail, wherein like numerals have been employed to designate various parts throughout the several views, it will be seen that one embodiment of the panel fastening device contemplated by the present invention is shown in Figs. 1 to 4, inclusive. In Fig. 1, a plurality of instrument panel sections 10, 12, 14, 16 and 18 are disclosed. These panel sections differ in width in accordance with the size and type of instruments carried thereby. These panel sections are carried by upright channeled frame members 20. It will be seen from Figs. 2 and 3 that these channel members 20 may be in the form of extruded metallic channels, as, for example, aluminum or aluminum alloy channels. Such channels, while light in weight, are sufficiently rigid to counteract tendencies for the side walls thereof to be sprung apart when a fastening stud member 22 is tightened therein. The upper margins of the channeled side walls extend inwardly so as to provide substantial elongated flat rigid surfaces 24 against which a complementary panel section may be clamped. The underside of these inwardly extending channel margins provide inclined cam surfaces 28 for coacting with a laterally extending lug or cross-pin 30 extending from the periphery of a stud shank 32 of the rotary fastener member 22.

The rotary clamping stud 22 is provided with a head 34, which in the disclosed embodiment carries a wing portion 36 to facilitate manual rotation of the stud shank 32. It will be obvious that in instances where it is desirable, the wing structure 36 may be replaced by a conventional cross-slot in the head 34 to accommodate a turning tool, such as a screw driver. The shank 32 of the rotary fastener extends through an aperture 38 provided in the panel section 10, and interposed between the clamping side of the stud head 34 and the panel section is a spring or tension washer 40.

It will be apparent from the foregoing that each of the panel sections has mounted therein at least four rotary fastener members 22. In mounting these rotary fastener members within their respective panel sections, the shank 32 must be inserted through the aperture 38 in the panel section prior to the association of the cross-pin 30 with said shank. Also, before insertion of the shank 32, the spring washer 40 must be telescopically associated with the shank so that it will be positioned between the outer surface of the panel section and the underside of the stud head. After the assembly of the washer 40 with the stud shank and the insertion of the shank into the panel aperture 38, the cross-pin or lug 30 may be inserted within the shank. Thus, the rotary fasteners 22 are carried by the panel sections without any danger of detachment therefrom. When the panel sections are applied to the channeled frame members 20, the cross-pins 30 are positioned so that they extend in parallelism with the longitudinal opening 42 of the channel, thereby permitting complete entrance of the stud shanks 32 and engagement of the inner surface of the panel section with the bearing surfaces 24 of the channels. Subsequent rotation of the shank 32 through approximately 90° causes opposite extremities of the cross-pin 30 to be moved into engagement with the inclined surfaces 28 of the channel, thereby exerting a camming action which causes the stud head 34 to be drawn inwardly against the resilient resistance of the spring washer 40. This resilient action of the spring washer 40 establishes firm clamping engagement of the panel action against the channeled frame member. In order to provide a further interlock between the spring washer 40 and the stud head 34, the washer is dimpled at 44 to accommodate a complementary protuberance 46 extending from the clamping surface of the stud head. In applications where the circumstances require it, surfaces 24 of the channel member may be roughened or knurled, as indicated by the stippling in Fig. 3. This assures increased frictional resistance to relative shifting between the panel sections and the channel members.

In Figs. 5 and 6 a slightly modified channeled frame member is shown, designated by the numeral 20a. This channel member 20a is of sufficient thickness to secure the side walls against spreading when the rotary fastener is tightened in place. The channel member 20a is bent back upon itself along the free margins to provide cam members 28a. These members 28a may be absolutely rigid, or in certain instances, may be sufficiently resilient to cooperate with the cross-pin or lug 30 in resiliently clamping the panel section against the channel member. In Fig. 5, the wing on the head 34 is indicated by dot and dash lines, and the head 34 is provided with a conventional cross-slot 36a. It will be apparent that the channel member 20a may be produced from suitable sheet metal stock, as distinguished from the extruded or cast material from which the channel member 20 is made. In Fig. 6 a perspective view of the channel member 20a is shown.

From this view it will be seen that the underside of the cam or flange 28a is provided with undulations 48 which cooperate with the lateral lugs or cross-pin extensions 30 to hold the stud 32 in a fixed position once the rotary fastener has been rotated to the position illustrated in Fig. 5.

In Fig. 7 a modified fastener lug arrangement is shown. The lateral lugs of Fig. 7 are designated by the numeral 30a, and are provided with cam surfaces which eliminate the necessity of inclining the complementary inturned surfaces of the channel member 20. In Figs. 2 and 5 the channel members are provided with inclined surfaces 28—28a, respectively, adapted for camming engagement with the cross-pin 30. The device of Fig. 7 incorporates the inclined cam surface solely within the lateral lugs 30a. In all of the embodiments, the spring washer 40 functions to establish resilient or axial tension when the stud is secured in its fastening position.

From the foregoing it will be apparent that the present invention provides a very convenient, inexpensive and vibration resisting fastening device for panel sections and the like. By maintaining an opening or slot of uniform width along the mouth of each channel member, the panel sections may be vertically adjusted to any desired position and then quickly and firmly secured in place by manual manipulation of the four rotary fastener members or studs. That is to say, the fastening is such that no displacement or disfigurement of the channel member takes place at any time, thereby assuring absolute alignment of the panels, coupled with powerful clamping action of the stud cross-pin or lugs against the cam surfaces of the channel members. By employing the resilient or spring washer members beneath the stud head, automatic clamping occurs as an incident to stud rotation, and this axial "take up" positively secures against loosening as a result of the severest vibrations, as for example, vibrations to which aircraft and the like are subjected. Obviously, the invention is not in any sense limited to fastening aircraft instrument panel sections in place, but lends itself for practical use in any instance where a positive, yet quick acting, fastening device is needed to secure plates or sheets along channeled frame members.

While for purposes of illustration certain structural details have been disclosed herein, it should be understood that the invention is capable of modifications and changes without departing from the spirit and scope of the appended claims.

I claim:

1. A fastener device for securing panel sections and the like comprising in combination an elongated channel member having a pair of longitudinally disposed side walls having inwardly projecting portions at the free edges thereof providing panel abutment surfaces along the opening between the side walls of the channel member and against which a panel section is adapted to be seated, said side walls having inner surfaces each adjacent to a corresponding abutment surface and each disposed at an acute angle relative to its adjacent abutment surface and directed outwardly away from each other and providing symmetrically disposed cam surfaces, and a rotary stud member including a shank positioned in the opening between the side walls of the channel member and having a head overlying the abutment surfaces, and a pair of opposed lugs extending radially outwardly from the stud shank at a predetermined distance from said head and each lug being in engagement with a corresponding cam surface within the channel member upon rotation of the stud member for engaging a panel section between the head and the abutment surfaces of the channel member as an incident to rotation of the stud relative to said channel member.

2. A fastener device as claimed in claim 1, wherein a spring washer is positioned coaxially with said shank adjacent the underside of the stud head for engagement with a panel for establishing axial tension in response to stud rotation and engagement of the lugs with the cam surfaces.

3. A fastener device as claimed in claim 1, wherein the cam surfaces are undulated for effective interlocking with the lugs.

4. A fastener device as claimed in claim 1, wherein the channel member is formed of sheet material having each cam surface provided by an inturned continuation of the adjacent inwardly projecting portion.

OUGLJESA JULES POUPITCH.

REFERENCES CITED

The following references are of record in the file of this patent:

UNITED STATES PATENTS

| Number | Name | Date |
|---|---|---|
| 358,389 | Dunn | Feb. 22, 1887 |
| 1,456,555 | Hubbell | May 29, 1923 |
| 2,041,335 | Hall | May 19, 1936 |
| 2,055,759 | Venzie | Sept. 29, 1936 |
| 2,123,068 | Summers | July 5, 1938 |
| 2,180,925 | Dyresen | Nov. 21, 1939 |
| 2,208,159 | Lichtor | July 16, 1940 |
| 2,262,418 | Zahodiakin | Nov. 11, 1941 |
| 2,342,170 | Tinnerman | Feb. 22, 1944 |
| 2,350,255 | Shippee et al. | May 30, 1944 |

FOREIGN PATENTS

| Number | Country | Date |
|---|---|---|
| 491,733 | Great Britain | Sept. 8, 1939 |